United States Patent [19]

Libowitz

[11] 4,040,410
[45] Aug. 9, 1977

[54] THERMAL ENERGY STORAGE SYSTEMS EMPLOYING METAL HYDRIDES

[75] Inventor: George G. Libowitz, Brookside, N.J.

[73] Assignee: Allied Chemical Corporation, Morris Township, N.J.

[21] Appl. No.: 695,678

[22] Filed: June 14, 1976

Related U.S. Application Data

[63] Continuation-in-part of Ser. No. 528,302, Nov. 29, 1974, abandoned.

[51] Int. Cl.² .......................... F24J 3/02; C01B 6/00
[52] U.S. Cl. .......................... 126/270; 165/104 M; 165/105; 423/644; 423/645
[58] Field of Search .......................... 126/270, 271; 165/104 M, 105

[56] References Cited

U.S. PATENT DOCUMENTS

| | | | |
|---|---|---|---|
| 3,167,159 | 1/1965 | Bovenkerk | 165/96 X |
| 3,427,808 | 2/1969 | Butcher | 126/270 |
| 3,785,365 | 1/1974 | Laing et al. | 165/105 |
| 3,894,528 | 7/1975 | Stubblefield | 126/270 |

Primary Examiner—John J. Camby
Attorney, Agent, or Firm—David W. Collins; Ernest A. Polin

[57] ABSTRACT

Thermal energy storage systems employing metal hydrides are useful for storing thermal energy produced, for example, by solar radiation. The metal hydrides, examples of which include FeTiH and the $VH-VH_2$ reaction system, evidence ease of reversibility of the metal-hydrogen reaction and have relatively high heats of formation. An additional advantage of the metal hydrides over other thermal storage materials is that the metal hydrides permit a greater degree of control to be exercised over the rate of heat evolution when needed.

19 Claims, 2 Drawing Figures

THERMAL ENERGY STORAGE SYSTEMS EMPLOYING METAL HYDRIDES

This is a continuation-in-part of application Ser. No. 528,302, filed Nov. 29, 1974, now abandoned.

BACKGROUND OF THE INVENTION

1. Field of the Invention

The invention relates to heating applications and, in particular, to storing thermal energy produced by solar radiation.

2. Description of the Prior Art

Solar radiation appears promising as a potential energy source, and much effort has been expended to developing various machanisms to convert solar radiation to useable power, such as thermal or electrical power. For obvious reasons, energy storage is an important adjunct to any solar radiation power system. Such storage can occur either immediately following collection of solar radiation (thermal storage) or following conversion of solar radiation into, for example, electrical energy (electrical storage).

To be effective and practical, a storage system must be highly reversible. It should be simple, self-regulating, service-free and capable of extended cycle life, high efficiency and rapid charge-discharge cycles.

Thermal energy can be stored by the heating, melting or vaporizing of a material, and the energy becomes available as heat when the process is reversed. For example, the heat capacity of a substance (sensible heat) may be utilized; common examples of such substances include water and crushed rock. Such an arrangement, however, requires extensive insulation in order to retain heat until the period of non-illumination, when it will be needed. Another example of a thermal energy system employs the latent heat evolved upon transition of a substance from one phase to another (e.g. solid to liquid state or liquid to vapor state) at a constant temperature. Such a phase change storage system requires, for example, low melting eutectic materials having high latent heats. However, as heat is withdrawn, the material fuses onto cold surfaces and heat must then be conducted through frozen material. Thus, in addition to the insulation requirement noted above, a material of high thermal conductivity is desirable. As a consequence of the requirements of high latent heat, high thermal conductivity and extensive insulation, economic considerations play an important role in the selection of a suitable material.

Storage systems employing hydrogen-containing compositions have been previously described. For example, in U.S. Pat. No. 3,070,703, issued Dec. 25, 1962 to W. H. Podolny, a storage system is disclosed which includes an electrolysis unit wherein electricity generated from solar energy forms hydrogen and oxygen from water. The gases are stored for later use. Subsequently, recombination of the two gases in a fuel cell to form water produces electricity.

Another storage system is disclosed in U.S. Pat. No. 3,459,953, issued Aug. 5, 1969 to W. L. Hughes et al. There, the storage system includes an electrolysis unit wherein surplus electrical energy generated from solar radiation is utilized to form hydrogen oxygen from water. The two gases are later reacted in an aphodid burner to produce steam, which is then used to drive a turbine which in turn drives a generator. These systems, however, deal with electrical storage and consequently are not applicable to thermal storage systems.

Hydrogen-containing compositions in thermal storage systems are disclosed in U.S. Pat. No. 1,002,768, issued Sept. 5, 1911 to F. Shuman, which discloses a reversible fluid cycle employing, for example, ammonia dissolved in water. A source of heat (solar radiation) releases the gas. When the gas is later permitted to redissolve in the liquid, heat is evolved by the heat of reaction. A similar system is disclosed in U.S. Pat. No. 1,171,305, issued Feb. 8, 1916 to C. H. Beadle.

Use of metal alkyl hydrides for storing thermal energy is disclosed in U.S. Pat. No. 3,064,640, issued Nov. 2, 1962 to E. E. Donath. That patent, however, is directed to external heating devices which employ an irreversible reaction of the metal alkyl hydride plus air to produce heat.

Metal alloys which form metal hydrides by absorbing hydrogen have been disclosed in, for example, U.S. Pat. Nos. 3,315,479, 3,375,676, 3,508,414 and 3,516,263, issued to R. H. Wiswall, Jr. et al. These patents, however, are directed to storing hydrogen for subsequent use in fuel cells and as rocket fuel. The particular metal alloy hydrides employed feature low heats of reaction in order to reduce heat dissipation problems.

The use of a metal hydride system as a heat pump to generate intermittent high energy power from a low energy isotope source has been disclosed by W. E. Winsche in U.S. Pat. No. 3,504,494. That patent, however, does not encompass the concept of thermal energy storage.

There remains a need for a thermal storage system employing materials having ease of reversibility, high heat of reaction, and ease of control over the rate of heat evolution.

SUMMARY OF THE INVENTION

In accordance with the invention, a reversible, closed thermal energy storage system is provided for storing thermal energy produced by a source of heat and for supplying heat to a living space. The storage system employs a metal hydride that dissociates at elevated temperatures to form metal plus hydrogen gas. The hydrogen gas is stored in a separate container either as compressed gas or as a secondary, less stable storage hydride. The hydrogen is subsequently recombined with the metal to reform the metal hydride and give off heat, as needed. The storage system is particularly useful in solar radiation heating systems.

The storage system for supplying heat to the living space comprises:

a. means for containing a material, the containing means exposed to an external source of heat, the material comprising at least one metal hydride capable of reversible dissociation into metal plus hydrogen gas and having a heat of formation of at least $-5$ kcal/mole, the external source of heat adapted to heat the material to a temperature sufficient to cause the dissociation of said material;

b. means for storing the hydrogen gas separate from the metal and apart from the living space;

c. means for communicating between the containing means and the storing means; and d. means for controllably recombining substantially all of the hydrogen gas with the metal in the containing means to regenerate substantially all of the metal hydride to produce heat, with additional means for transporting the produced heat to the living space.

Also in accordance with the invention, a process is provided for reversibly storing heat and releasing heat in a closed cycle to a living space comprising:

a. heating at least one metal hydride (1) maintained in a container, (2) capable of reversible dissociation into metal plus hydrogen gas and (3) having a heat of formation of at least −5 kcal/mole to a temperature sufficient to cause the dissociation;

b. storing the hydrogen gas in a means separate from the metal and apart from the living space for a period of time;

c. controllably recombining substantially all of the hydrogen gas with the metal in the container to regenerate substantially all of the metal hydride to produce heat; and d. transporting the produced heat from the recombination to the living space.

The metal hydrides, specific examples of which include $FeTiH_{1.7}$ and the $VH-VH_2$ reaction system, evidence both ease of reversibility and high hydrogen storage capacity. The rate of heat evolution from the metal-hydrogen reaction is easily controlled.

The metal employed may comprise any of the hydride-forming metallic elements or a hydride-forming alloy.

Where two metal hydrides are employed comprising a primary metal hydride for dissociation and a secondary metal hydride for storage, the primary metal hydride should have a relatively high heat of formation, while the secondary metal hydride should have a low heat of formation. When the recovery of stored heat is desired, hydrogen is bled from the secondary metal hydride and is permitted to recombine to form the primary metal hydride. In some instances, a portion of the heat produced may be used to further dissociate the secondary metal hydride to generate additional hydrogen gas.

DETAILED DESCRIPTION OF THE INVENTION

The description which follows is given in terms of a residential power system for supplying non-electrical power by solar radiation. Such a system may be used either alone to supply substantially all heating requirements or in combination with some other power system to supply the total of all energy requirements. It should be clear that the disclosed thermal energy storage system also may be employed in other heat producing systems, whether residential or commerical, examples of which include waste heat produced in commercial power systems, geothermal systems, and the like.

Many metals and alloys (M) react reversibly with hydrogen as follows:

where the metal hydride $MH_x$ is a chemical compound and the value of "x" depends upon the particular metal or alloy used. Examples of metal hydrides include $VH_2$, $FeTiH_{1.7}$, and $SmCo_5H_{2.5}$. While it is preferred that M be predominantly a transition or rare earth metal or mixture thereof, M may also advantageously be an alkali or alkaline earth metal. Many of the metal hydrides are able to retain large quantities of hydrogen in a relatively small volume. Since Eqn. (1) is easily reversible, certain metal hydrides are ideal candidates as efficient hydrogen storage materials. Typically, many metal hydrides have fairly high heats of reaction, or formation. Thus, in accordance with the invention, these materials may be used for storing thermal energy produced by a source of heat, such as in solar power applications.

The heat generated by solar radiation is sufficient to dissociate many metal hydrides into metal plus hydrogen gas. The gas is then stored for a period of time in a container of some sort, thereby effectively storing the heat. The stored heat is subsequently recovered by allowing the metal and hydrogen to recombine according to Eqn. (1) and utilizing the heat of formation of the metal hydride created during the recombination. The recombination is controlled by, for example, a valve.

Figure 1:
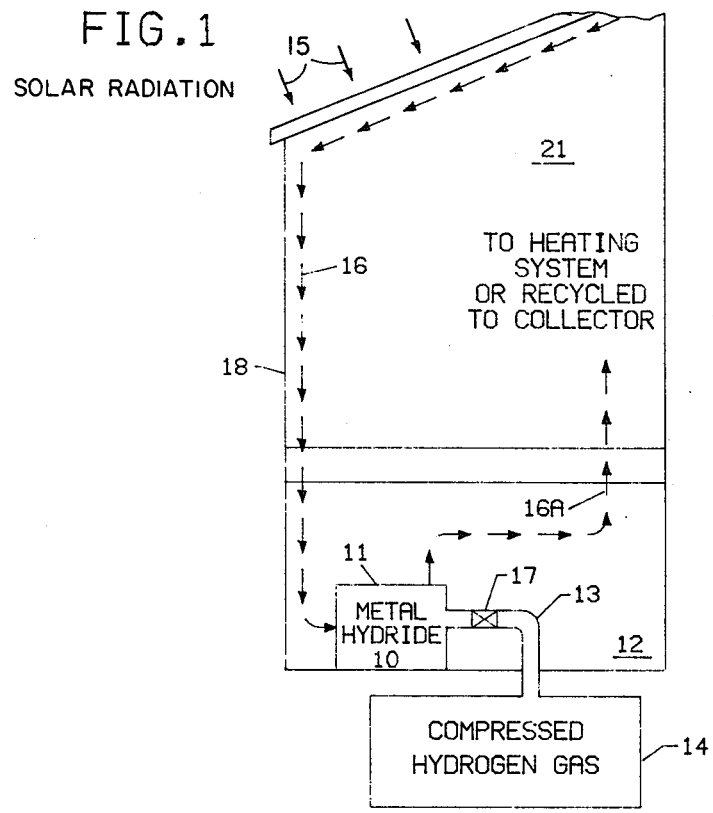
FIG. 1, in cross-section, depicts a typical residential application of a solar radiation power system including a thermal energy storage system.

Two reversible, closed cycle configurations may be employed for use in homes, although there may be others as well. As shown in FIG. 1, a metal hydride 10 is stored in a small reservoir 11 in the basement 12 of a house 18 which includes a living space 21. The container communicates through suitable means 13, such as pipes, with a hydrogen storage tank or reservoir 14 located, for example, underground outside of the house. The heat resulting from solar radiation 15 is transferred to the metal hydride by using a suitable heat transport fluid 16, such as water or air, for example. The hydrogen evolved is stored in the larger reservoir 14. When heat is required, the hydrogen gas is allowed to recombine with the dehydrided metal through valve 17, and the same heat transport fluid 16 may be conveniently used to transport the resulting heat to desired locations in the house 18, employing a suitable heat transport fluid 16A, plumbing, circulators, etc.

Figure 2:
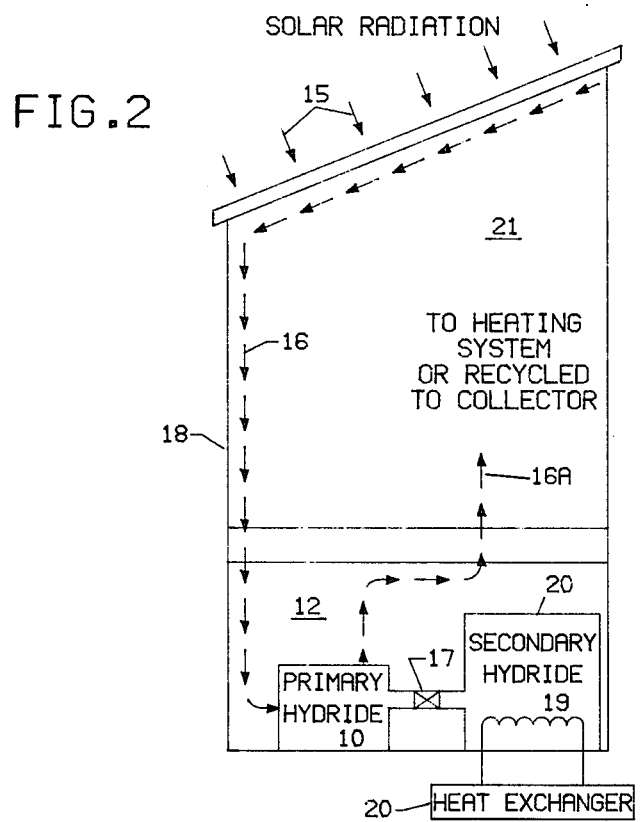
FIG. 2, also in cross-section, depicts an alternate power system configuration, also for a residential application.

An alternative method of storing the hydrogen gas more effectively in a given volume is shown in FIG. 2. An additional metal or alloy which is capable of forming a second, or secondary, metal hydride 19 that is less stable than the first, or primary, metal hydride 10 is stored in a storage reservoir 20 also located in the basement 12. The hydrogen gas from the primary metal hydride 10 (generated by solar heat) would be absorbed by the secondary metal hydride 19 at ambient temperature. It is desirable that a metal hydride be chosen as the secondary metal hydride which would have a lower dissociation pressure at ambient temperature than that of the primary metal hydride at elevated (solar heat) temperatures (about 200° F); and that this same dissociation pressure at ambient temperature should be higher than that of the primary metal hydride at ambient temperature. This would permit spontaneous flow of hydrogen through valve 17 from the secondary metal hydride 19 to the dehydrided primary metal 10 during the periods of heat recovery. The temperature of the secondary metal hydride would be kept near ambient via the heat exchanger 20. In cases where the dissociation pressure of the secondary metal hydride is not high enough to permit the spontaneous flow of hydrogen, a portion of the heat energy generated by the formation of the primary metal hydride, perhaps 10%, may be used to heat the secondary metal hydride in order to raise the dissociation pressure so that hydrogen will flow to the dehydrided primary metal. This portion of heat can be transferred employing a suitable heat transport fluid, plumbing, circulators, etc. (not shown). An alternate method for the transfer of hydrogen from one metal hydride bed to another is by the use of a compressor (not shown).

One example of an alloy which would be useful in forming a secondary metal hydride with, for example, $VH_2$ as the primary metal hydride, is FeTi. At room temperature, $FeTiH_{1.7}$ has a dissociation pressure of 7.3 atm, which is considerably lower than the 39 atm dissociation pressure of $VH_2$ at 200° F, thus permitting easy hydrogen flow from the primary metal hydride to the secondary metal hydride. When the primary metal hydride, $VH_2$, is at room temperature, it has a dissociation pressure of 1.5 atm, which is less than the 7.3 atm of the $FeTiH_{1.7}$, thus permiting easy hydrogen flow in the reverse direction and consequently permitting reformation of the primary metal hydride to regenerate heat.

In an alternate arrangement (not depicted), the metal hydride is placed in a container on the roof. The container may be a sealed flat metal container or a series of cylindrical tubes, for example. This configuration eliminates the need for a heat transfer fluid to transfer heat from the solar rays to the metal hydride, since the metal hydride is heated directly by the solar radiation, and the hydrogen formed by the dissociation of the metal hydride is transferred to the hydrogen storage tank or to the secondary hydride by suitable means such as pipes from the roof container to the hydrogen storage container. This configuration is practical where the primary metal hydride is formed from a light metal so that the weight load on the roof of the house is not excessive.

One major advantage of using a metal hydride as a thermal storage material is the ability to control the rate of heat evolution. For most thermal storage materials, the heat is evolved spontaneously. This is true for both the sensible heat materials (e.g. water, crushed rock, etc.) and the phase change materials (e.g. low eutectic temperature salts). Consequently, a large amount of insulation is required to prevent too rapid a heat loss. However, in the systems described herein, in which the hydrogen gas is separated from the hydriding metal, the stored heat may be recovered when required, or it may even be stored indefinitely, with no need for insulation. Thus, with efficient metal hydride systems, thermal energy may be stored over an extended period of time, possibly even storing summer heat for winter use.

Metal-hydrogen systems are also non-corrosive and they can undergo indefinite cycling with no chemical degradation, which is a problem with existing phase change materials. An additional advantage of metal hydrides resides in their high thermal conductivities, which permit efficient heat transfer to the heat transport fluid.

The thermal storage capacity of a metal hydride, $E_s$, in Btu/lb is:

$$E_s = 1800 n\, \Delta H_f / MW \tag{2}$$

where $\Delta H_f$ is the heat of formation of the metal hydride in kcal/mole of $H_2$, "n" is the number of moles of hydrogen contained in a mole of the metal hydride and MW is the molecular weight of the metal hydride. (The negative sign for $\Delta H_f$ is used because Eqn. (1) is exothermic.) In order to have substantially complete dissociation of the metal hydride in typical applications, the metal hydride is heated to an elevated temperature. A temperature of about 200° F (367° K) is typically obtained by solar radiation, although solar concentrators and other similar apparatus, operating at even higher temperatures, may also be employed.

It is seen from Eqn. (2) that the most desirable metal hydrides would be those with large negative values of $\Delta H_f$, high hydrogen content and low molecular weights.

An average home requires about $2 \times 10^5$ Btu (about $2 \times 10^8$ joules) of nonelectrical energy per day. This amount of energy can be easily collected over several hundred square feet on the roof of the house. Several primary metal hydrides that are capable of storing the amount of energy by the schemes shown in FIGS. 1 and 2 are listed in the Table below. Also listed are (a) the heats of formation, (b) the equilibrium dissociation pressures of the metal hydride at 200° F ($P_H$) and 70° F ($P_C$) and (c) the thermal storage capacities. These latter values are calculated from Eqn. (2). The values of $P_H$ and $P_C$ in the Table are computed from published thermodynamic data on these metal hydrides, assuming that the solar-heated metal hydride attains a temperature of 200° F. Typically, the volume required to store the metal hydride, which is conveniently in the form of a fine powder, is about 5 cubic feet.

TABLE

| Metal Hydrides Capable of Storing Thermal Energy ($2 \times 10^5$ Btu) | | | | |
|---|---|---|---|---|
| Metal Hydride | $-\Delta H_f$ (kcal/mole $H_2$) | $P_H$ at 200° F (atm) | $P_C$ at 70° F (atm) | $E_s$ Btu/lb |
| $LaNi_5H_{6.7}$ | 7.2 | 22 | 2.4 | 95 |
| $SmCo_5H_{2.5}$ | 7.4 | 58 | 4.1 | 37 |
| $VH-VH_2$ | 9.6 | 39 | 1.5 | 171 |

The rare earth cobalt and nickel hydrides can store large quantities of hydrogen, and they have high dissociation pressures at moderately low temperatures.

To date, the most efficient metal hydride system for the storage of solar thermal energy is the $VH-VH_2$ system, and is accordingly preferred. In this system, a lower metal hydride reacts with hydrogen to form a higher metal hydride:

$$1.92\, VH_{0.95} + H_2 \rightleftarrows 1.92\, VH_{1.99} \tag{3}$$

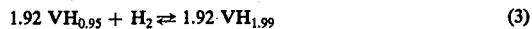

The weight of metal hydride required for this system is considerably less than for other metal hydrides. The cost of vanadium metal, however, may be an important economic factor.

The efficiency figures given in the last column of the Table compare favorably with other phase change storage materials. One of the best such materials is methyl fumarate, which provides 104 Btu/lb at a melt temperature of 216° F.

It is seen from Eqn. (2) that metal hydrides with high energy storage capabilities should preferably have large negative values of $\Delta H_f$. A preferred value of $\Delta H_f$ is at least $-5$ kcal/mole. Since $\Delta H_f$ is a measure of the strength of the bond between metal and hydrogen, then in selecting new metal alloy hydrides, alloying elements should be sought which will strengthen the bonding of known metal hydrides. That is, the more stable metal hydrides are preferred.

In order to keep the required weight of metal hydride to a minimum, the value of $x$ in Eqn. (1) should be high. Therefore, another requirement of an alloying element is that it change the electronic or crystal structure of known metal hydrides such that the ability of accommodate more hydrogen in the metal lattice is enhanced.

To maintain a reasonably high rate of mass transfer of hydrogen, metal hydrides with fairly high dissociation pressures, greater than one atmosphere, are necessary. It can be shown that the integrated form of the van't Hoff equation may be written as:

$$\ln P = [(\Delta H_f/RT) - (\Delta S/R)] \quad (4)$$

where $\Delta S$ is the entropy change of Eqn. (1). Thus, although a large negative value of $\Delta H_f$ is desirable to provide a high heat of reaction, as discussed above, it is also associated with low hydrogen pressure, as shown in Eqn. (4). In selecting new alloy hydrides, it is necessary to maintain as high a negative value of $\Delta H_f$ as possible (i.e., strong metal to hydrogen bonding), consistent with maintaining a high equilibrium value of hydrogen pressure. It is possible to accomplish this by having low, or preferably large negative, values of $\Delta S$. This means that the entropy of the alloy from which the hydride is formed should be near, or preferably, higher than the entropy of the corresponding metal. To meet these criteria, such alloys should have a disordered structure, such as found in a random order alloy or an amorphous alloy.

The secondary, or storage, metal hydride should have as low a negative value of $\Delta H_f$ as possible so that very little energy is needed in recovering the hydrogen. Iron-titanium hydride, $FeTiH_{1.7}$, which has a value of $\Delta H_f$ of $-6.7$ kcal/mole, meets this requirement and is accordingly preferred. It is also desirable to have as large a value of $x$ in Eqn. (1) as possible so that a large amount of hydrogen can be stored efficiently.

What is claimed is:

1. A reversible, closed thermal energy storage system for supplying heat to a living space comprising:
    a. means for containing a material, said containing means exposed to an external source of heat, said material comprising at least one metal hydride capable of reversible dissociation into metal plus hydrogen gas and having a heat of formation of at least $-5$ kcal/mole, said external source of heat adapted to heat said material to a temperature sufficient to cause said dissociation of said material;
    b. means for storing said hydrogen gas separate from said metal and apart from said living space;
    c. means for communicating between said containing means and said storing means; and
    d. means for controllably recombining substantially all of said hydrogen gas with said metal in said containing means to regenerate substantially all of said metal hydride to produce heat, with additional means for transporting said produced heat to said living space.

2. The thermal energy storage system of claim 1 wherein said external source of heat comprises solar radiation.

3. The thermal energy storage system of claim 2 wherein said containing means is exposed to said solar radiation by means of a heat transport fluid communicating between said containing means and said solar radiation.

4. The thermal energy storage system of claim 2 wherein said containing means is directly exposed to said solar radiation.

5. The thermal energy storage system of claim 1 wherein said recombining means includes a valve located between said containing means and said storing means:
    a. for keeping said metal and said hydrogen gas separated, and
    b. for permitting controlled recombination of said hydrogen gas with said metal to regenerate said metal hydride, thereby releasing stored thermal energy so as to produce said heat.

6. The thermal energy storage system of claim 1 wherein said metal hydride includes at least one metallic element.

7. The thermal energy storage system of claim 6 wherein said metal hydride comprises the reaction system $VH-VH_2$.

8. The thermal energy storage system of claim 6 wherein said metal hydride includes a metal alloy having a disordered structure.

9. The thermal energy storage system of claim 1 wherein said material consists essentially of a first metal hydride adapted to reversibly dissociate into a first metal plus hydrogen and wherein said storing means includes a quantity of a second metal adapted to absorb a portion of said hydrogen gas to form a second metal hydride less stable than said first metal hydride.

10. The thermal energy storage system of claim 9 further including means for transmitting a portion of said produced heat to said storing means to heat said second metal hydride, thereby releasing substantially all of said absorbed hydrogen gas in said second metal hydride for additional recombination with said first metal.

11. The thermal energy storage system of claim 9 wherein said second metal hydride comprises $FeTiH_{1.7}$.

12. A process for reversibly storing heat and releasing heat in a closed cycle to a living space comprising:
    a. heating at least one metal hydride (1) maintained in a container, (2) capable of reversible dissociation into metal plus hydrogen gas and (3) having a heat of formation of at least $-5$ kcal/mole to a temperature sufficient to cause said dissociation;
    b. storing said hydrogen gas in a means separate from said metal and apart from said living space for a period of time;
    c. controllably recombining substantially all of said hydrogen gas with said metal in said container to regenerate substantially all of said metal hydride to produce heat; and
    d. transporting said produced heat from said recombination to said living space.

13. The process of claim 12 wherein said metal hydride is heated by solar radiation.

14. The process of claim 12 wherein said metal hydride includes at least one metallic element.

15. The process of claim 14 wherein said metal hydride comprises the reaction system $VH-VH_2$.

16. The process of claim 14 wherein said metal hydride includes a metal alloy having a disordered structure.

17. The process of claim 12 wherein said metal hydride consists essentially of a first metal hydride capable of reversible dissociation into a first metal plus hydrogen gas, wherein a portion of said hydrogen gas is reacted with a second metal in said storing means to form a second metal hydride less stable than said first metal hydride.

18. The process of claim 15 wherein a portion of said produced heat is used to heat said second metal hydride to a temperature sufficient to form said second metal plus hydrogen gas, which is also controllably recombined with said first metal to produce heat.

19. The process of claim 15 wherein said second metal hydride comprises $FeTiH_{1.7}$.

* * * * *